United States Patent [19]

Tanaka et al.

[11] Patent Number: 4,601,535
[45] Date of Patent: Jul. 22, 1986

[54] OPTICAL COUPLING SYSTEM WITH INTERMEDIATE COUPLING MEDIUM

[75] Inventors: Toshiki Tanaka, Ome; Katsuyuki Imoto, Sayama; Naoki Chinone, Hachioji, all of Japan

[73] Assignee: Hitachi, Ltd., Tokyo, Japan

[21] Appl. No.: 715,257

[22] Filed: Mar. 25, 1985

[30] Foreign Application Priority Data

Mar. 23, 1984 [JP] Japan .................................. 59-54234

[51] Int. Cl.$^4$ ................................................. G02B 6/42
[52] U.S. Cl. ............................. 350/96.20; 350/96.15
[58] Field of Search ............... 350/96.15, 96.17, 96.18, 350/96.20; 250/227; 357/17, 19

[56] References Cited

U.S. PATENT DOCUMENTS 3,995,935 12/1976 McCartney ...................... 350/96.15
4,081,208 3/1978 Meade .............................. 350/96.20
4,358,851 11/1982 Scifres et al. ................. 350/96.18 X
4,490,020 12/1984 Sakaguchi et al. ............... 350/96.18

FOREIGN PATENT DOCUMENTS 2556693 7/1976 Fed. Rep. of Germany ... 350/96.15

OTHER PUBLICATIONS

Crow, J. D., "Integral Source/Receiver Package for Optical Data," IBM Technical Disclosure, vol. 20, No. 5, (Oct. 1977) pp. 2089-2090.

Primary Examiner—John Lee
Assistant Examiner—Lester Rushin, III
Attorney, Agent, or Firm—Antonelli, Terry & Wands

[57] ABSTRACT

An optical coupling system between a semiconductor laser and an optical fiber is disclosed. The system is characterized in that a medium having a refractive index greater than 1 but smaller than the refractive index of the semiconductor laser material is packed between the end surface of a distributed feedback type or distributed Bragg reflector type semiconductor laser and the end surface of an optical fiber.

4 Claims, 11 Drawing Figures

OPTICAL COUPLING SYSTEM WITH INTERMEDIATE COUPLING MEDIUM

BACKGROUND OF THE INVENTION

This invention relates to a coupling system of a semiconductor laser and an optical fiber, and more particularly to an optical coupling system which is effective for reducing reflected return light from an end surface of an optical fiber.

Semiconductor lasers have been used widely as a light source for optical fiber communication. A so-called "Fabry-Perot" type semiconductor laser has been developed to this date which uses the cleavage plane of a laser crystal as a mirror surface, and feeds back light by this mirror surface. The semiconductor laser having this structure has a characteristic feature in that when modulation is directly effected using high speed pulse signals in the order of Mb/s to Gb/s, a plurality of longitudinal modes oscillate essentially. As a result, an oscillation spectral width becomes greater, and noise develops due to the competition of a plurality of longitudinal modes. Therefore, it has been difficult to apply this semiconductor laser to a high speed long distance optical fiber transmission system for which a small oscillation spectral width and low noise characteristics are requisites. To obviate this problem, semiconductor lasers such as DFB (Distributed Feed Back) and DBR (Distributed Bragg Reflector) that feed back the light by spatially distributing the light using a grating, or the like are utilized. These semiconductor devices are disclosed in the following reference, for example:

Y. Suematsu, "Recent Progress in Dynamic-Single-Mode (DSM) Semiconductor Lasers in Long Wavelength Range and Integrated Optics", 28B1-3, Technical Digest of 4th IOOC, June, 1983.

It has been represented experimentally that even when direct modulation is effected by high speed pulse signals, these semiconductor lasers provide oscillation spectral characteristics as narrow as about 0.1 nm. Recently, it has been clarified that when the light emitted from a DFB laser is reflected by a reflection surface outside the laser and is again coupled with the laser, the oscillation wavelength jumps discretely and causes large noise, as described in the following reference, for example:

Y. Yoshikuni et al., "Intensity Fluctuations of 1.5 $\mu$m GaInAsP/InP Distributed Feedback Lasers", 29D3-12, Technical Digest of 4th IOOC, June, 1983.

This phenomenon has been explained as a mode jump effect due to an external resonator constituted by the external reflection surface. However, the mode jump occurs also due to extremely delicate reflected return light based upon the discontinuity of a refractive index on the end surface of an optical fiber when the optical fiber is disposed so as to face the semiconductor laser. Therefore, this becomes a crucial problem when applying the semiconductor laser to a high speed long distance optical fiber transmission system.

The reflected return light from the end surface of the optical fiber to the semiconductor laser can be reduced, in principle, by inserting an optical isolator between the optical fibers of the semiconductor laser, for example, but this method involves the problems that coupled optical power to the optical fiber drops due to the insertion loss of the optical isolator, the size of the coupling system between the laser and the fiber becomes great, and the cost of production becomes higher.

SUMMARY OF THE INVENTION

The present invention is directed to provide an optical coupling system between a DFB or DBR semiconductor laser and an optical fiber which reduces the reflection of light from the end surface of the optical fiber without using any optical isolator.

Unlike the conventional Fabry-Perot type semiconductor lasers using reflection feedback due to a concentrated constantlike cleavage mirror surface, the feedback mechanism of light in the DFB or DBR laser is distributed spatially. Therefore, laser oscillation can be accomplished even when a medium having a refractive index greater than 1 is filled in an external space of the laser end surface, and the reflection coefficient of light on the laser end surface is reduced. The present invention employs a novel structure in that a transparent medium having a desired refractive index is packed between the DFB or DBR laser and the optical fiber end surface. In this structure, the refractive index is prescribed to be smaller than the refractive index of the semiconductor laser medium, be greater than 1 and preferably, be approximate to or greater than the refractive index of the optical fiber. The inventors of the present invention have found out that by so doing, the reflection of light on the optical fiber end surface can be reduced, the oscillation spectrum of the laser can be stabilized, and the laser light can be coupled with the optical fiber with a high level of efficiency. In other words, the constant of a diffraction grating of a grating constituting the distributed feedback mechanism fundamentally governs the oscillation spectral characteristics of the DFB and DBR lasers, but the oscillation mode determined by the distributed feedback mechanism is subject to disturbance by the Fabry-Perot resonator constituted by the optical fiber end surface, so that the oscillation spectrum becomes unstable.

In a coupling system in which an air layer is interposed between the laser and the optical fiber, the reflection quantity from the optical fiber end surface is in the order of about $-14$ dB with respect to the incident light, but if the refractive index of the packing medium is 1.5, for example, the reflection quantity can be improved by at least 20 dB to $-37$ dB, and the oscillation spectrum of the laser can be stabilized. In accordance with this system interposing the air layer, the optical fiber end surface must be spaced apart from the laser in order to reduce the coupling of the reflected light with the laser and to obtain stable oscillation characteristics. This means that the coupling efficiency must be sacrificed. In accordance with the coupling system of the present invention, on the other hand, the optical fiber end surface can be brought close to the laser, and high efficiency coupling can be accomplished.

Therefore, the optical coupling system of the present invention is a novel coupling system which can eliminate the problems of the prior art systems. Since the optical coupling system of the present invention can also reduce the reflection on the laser end surface, the invention can provide effective means for eliminating those adverse influences upon the oscillation characteristics which result from the arrangement that the end surface of the DFB or DBR laser itself constitutes the Fabry-Perot resonator.

BRIEF DESCRIPTION OF THE DRAWINGS

FIG. 3b is an enlarged side view of FIG. 3a;

DESCRIPTION OF THE PREFERRED EMBODIMENTS

Hereinafter, the present invention will be described in further detail with reference to the accompanying drawings.

Figure 1:
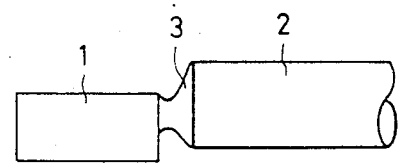
FIG. 1 is a side view useful for explaining the principle of an optical coupling system of the present invention.

FIG. 1 shows the principle of the optical coupling system of the present invention. In the drawing, reference numeral 1 represents a DFB semiconductor laser, 2 is an optical fiber and 3 is a packing medium whose refractive index is greater than 1 but is smaller than the refractive index of the semiconductor laser material. Generally, the low loss low dispersed light wavelength range of a silica-based optical fiber is from 1.2 to 1.6 μm, and a semiconductor crystal for the semiconductor laser oscillating at this wavelength is InGaAsP. The refractive index of this material is 3.6, and hence the range of the refractive index of the packing medium in this case is $1 < nm < 3.6$.

The reflection quantity R of light on the boundary surface having mutually different refractive indices $n_1$ and $n_2$ is given by:

$$R = \left[ \frac{n_1 - n_2}{n_1 + n_2} \right]^2 \quad (1)$$

Therefore, in order to reduce the reflection on the end surface of the optical fiber 2 facing the laser 1 in FIG. 1, it is preferred to bring nm as close as possible to the refractive index nf of the optical fiber. The refractive index of the silica-based low loss optical fiber is around 1.46, and the following materials can be used as the packing medium having such a refractive index:

(1) high molecular weight polymers obtained by solidifying vinyl type monomers having high transparency such as ethylene, butadiene, vinyl chloride, vinyl acetate, styrene, and the like, and acrylic type monomers such as acryclic acid, acrylonitrile, methyl methacrylate, ethyl methacrylate, butyl methacrylate, and the like, as optically or thermally polymerizable monomers (2) high molecular weight polymers obtained by adding a sensitizer (e.g., carbonyl compound, N-containing compound, halogen-containing compound, metal complex, or the like) to the monomers described above, and then solidifying the mixture;

(3) high molecular weight polymers obtained by packing low molecular weight compounds having compatibility with the lower molecular weight monomers described above before they change to the high molecular weight polymers;

(4) silicone resin (refractive index: 1.406-1.506);

(5) thermo-setting resins such as epoxy, phenol, polyester, and the like;

(6) adhesives (epoxy type, visible ray-setting type, UV-setting type such as Epotech 300 series adhesives of Epoxy Technology Co., U.S.A., having refractive index of about 1.56, OFTI-VLCA adhesive (refractive index 1.5078) of Optical Fiber Technology Co., and the like;

(7) thermoplastic resins such as phenoxy, polyvinyl acetal, polyester, and the like;

(8) fluororesins;

(9) materials comprising the combinations of the materials described above.

After being packed, these materials can be solidified by applying energy such as light or heat to them.

In accordance with the optical coupling system of the present invention, the space between the semiconductor laser 1 and the optical fiber 2 is filled with the packing medium 3 having a refractive index of greater than 1, so that the expanding angle of the outgoing light from the semiconductor laser becomes smaller than when the space consists of air, and the optical coupling efficiency can be therefore improved.

Figure 2A:
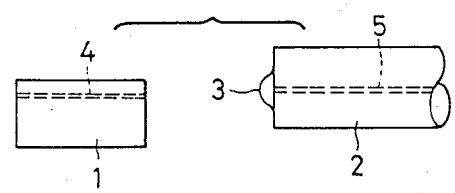
FIGS. 2a and 2b are side views, each showing the optical coupling system in accordance with one embodiment of the present invention.
Figure 2B:
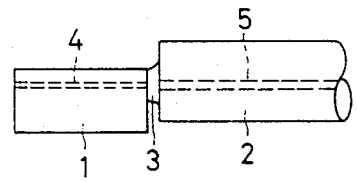

FIGS. 2a and 2b illustrate the optical coupling system in accordance with one embodiment of the present invention. Reference numeral 1 represents the DFB semiconductor laser, and reference numeral 4 shows a waveguide path equipped with a grating as the active region of the laser. Reference numeral 2 represents the optical fiber, and reference numeral 5 shows a core as an optical waveguide range. Reference numeral 3 represents a thermo-setting resin as the packing medium whose refractive index is in agreement with that of the optical fiber. First of all, as shown in FIG. 2a, the resin before setting is deposited with the core portion of the optical fiber end surface being the center. Next, the optical fiber 2 is brought close to the semiconductor laser 1 so that the packing medium 3 comes into contact with the end surface of the semiconductor laser 1. The semiconductor laser 1 is then driven for oscillation under this state, and the relative position between the semiconductor laser 1 and the optical fiber 2 is adjusted so that the laser light is well coupled with the core 5 of the optical fiber 2. Thereafter, while the relative position between the semiconductor laser 1 and the optical fiber 2 is being kept fixed, the packing medium 3 is thermally cured, thereby obtaining the desired optical coupling portion.

Figure 3A:
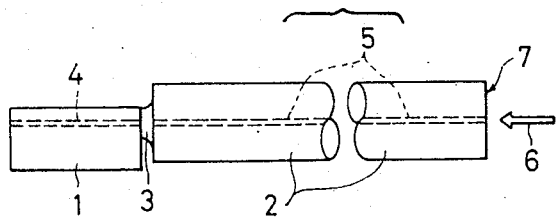
FIG. 3a is a side view showing another embodiment of the present invention.
Figure 3B:
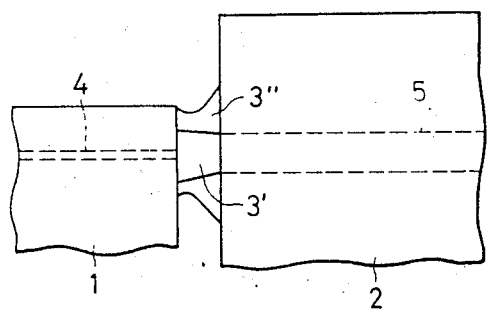

FIGS. 3a and 3b show another embodiment of the present invention. In this embodiment, the packing medium 3 is a UV curable resin, and the procedures up to the curing of the resin are the same as those of the foregoing embodiment shown in FIG. 2. FIG. 3a shows the state where the light from the semiconductor laser is well coupled with the core 5 of the optical fiber 2. Under this state, light 6 of a UV wavelength for curing the packing medium is allowed to be incident from the other end surface 7 of the optical fiber 2 so as to cure a part of the packing medium 3. FIG. 3b is an enlarged view of the optical coupling portion when the packing medium is cured in this embodiment. The packing medium 3 is cured by the UV rays emitted from the core 5 of the optical fiber 2, thereby forming the cured region 3'. After curing is completed, an uncured region 3" is removed by a solvent, thereby providing the desired optical coupling portion.

The two embodiments described above are directed to reduce the reflection on the end surface of the optical fiber 2. When the refractive index of about 1.5 is selected for the packing medium [using the aforementioned OFTI-VLCA (refractive index of 1.5078) of Optical Fiber Technology Co.,], for example, reflection on the optical fiber end surface can be reduced by about 25 dB in comparison with the case where no packing medium exists, whereas the reflection on the semiconductor laser end surface becomes smaller by only about 1.5 dB.

As is well known in the art, however, the non-reflection condition between two media having refractive indices $n_1$ and $n_2$, respectively, is that a medium having a thickness of $\lambda/4$ and a refractive index of $\sqrt{n_1 \cdot n_2}$ is to be inserted between the two media with $\lambda$ representing the wavelength of light. In the two embodiments described above, the reflection on both of the optical fiber end surface and the semiconductor end surface can be reduced by selecting the refractive index of the packing medium and the gap between the semiconductor laser and the optical fiber so as to satisfy the condition described above.

Figure 4:
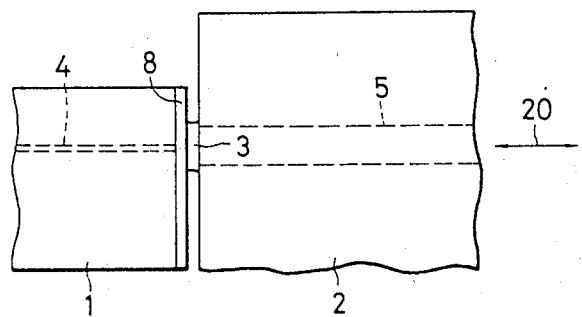
FIG. 4 is an enlarged side view of still another embodiment of the present invention.

FIG. 4 shows an example of the invention using the method described above. In this embodiment, a film 8 having a necessary refractive index is deposited by spattering or the like on the end surface of the semiconductor laser 1 in order to improve the controllability of the refractive index and thickness of the packing medium. When the semiconductor laser material is InGaAsP and the optical fiber base material is silica, the refractive indices of these materials are about 3.6 and about 1.46, respectively, so that the refractive index of the packing medium needs be about 2.3. An example of such a packing medium is $TiO_2$, which can be deposited easily by spattering or the like. The optical fiber is optically coupled with the semiconductor laser 1 via the packing medium 3 having a refractive index equal to that of the core 5 of the optical fiber 2, as shown in FIG. 4.

In the embodiment shown in FIG. 4, the single-layered film 8 is used in order to reduce the reflection on the semiconductor laser end surface and on the optical fiber end surface. The non-reflection characteristics will deteriorate if any error exists in the refractive index and in the film thickness, but such deterioration can be mitigated by forming a multi-layered film 8 and optimizing the film thickness and refractive index of each layer. In such a case, the refractive indices of the multi-layered film are changed step-wise with respect to the axis of optical coupling 20. The same effect can be obtained by using a film whose refractive index changes step-wise in the direction of the axis of optical coupling 20.

Figure 5:
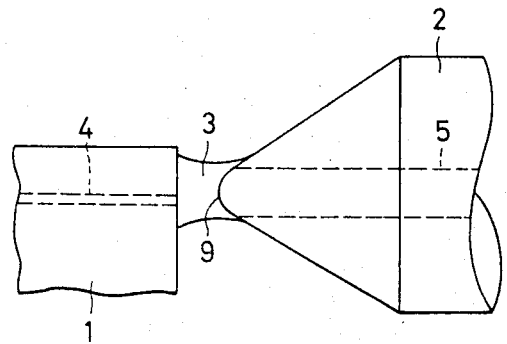
FIG. 5 is an enlarged side view of still another embodiment of the present invention.

FIG. 5 shows still another embodiment of the present invention. In this embodiment, the core 5 of the end surface of the optical fiber 2 facing the semiconductor laser 1 has a convex tip 9. When the refractive index of the packing medium 3 is different from that of the core 5, it becomes possible by shaping the tip of the core 5 in a convex shape not only to reduce the reflection in comparison with the case where the core 5 is a flat plane, but also to improve the optical coupling efficiency due to the convex-like lens effect.

The convex work of the core 5 can be made easily by polishing or etching the optical fiber 2 in the tapered shape and then fusing the tip.

Figure 6A:
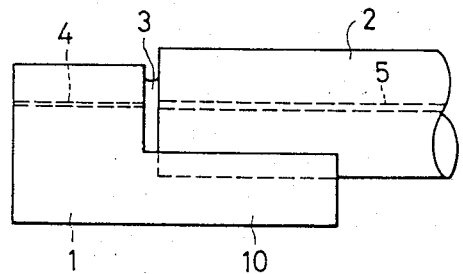
FIGS. 6a and 6b are side and front views of still another embodiment of the present invention.
Figure 6B:
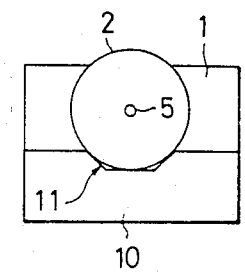

FIGS. 6a and 6b show still another embodiment of the present invention. In this embodiment, a high precision groove 11 is formed at the substrate portion 10 of the semiconductor laser 1 by anisotropically etching the crystal, and a part of the optical fiber 2 is inserted into this groove 11 so as to locate the optical fiber 2 to the semiconductor laser 1 with a high level of accuracy. The packing medium 3 is packed into the space between the semiconductor laser 1 and the optical fiber 3.

Though the foregoing embodiments deal with the DFB laser as the semiconductor laser, they can obviously be applied to the DBR laser.

Figure 7A:
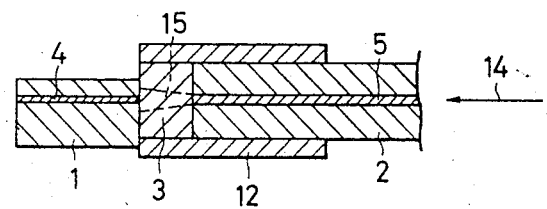
FIGS. 7a and 7b are a sectional side and perspective view showing the optical coupling system in accordance with still another embodiment of the present invention.
Figure 7B:
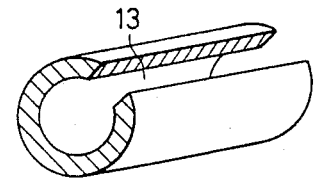

FIG. 7 shows the optical coupling system in accordance with still another embodiment of the present invention. In this embodiment, a split sleeve 12 is disposed around the outer circumference of the optical fiber 2, and a transparent medium 3 is packed into this split sleeve 12. As shown in FIG. 7b, the split sleeve 12 is equipped with a groove 13 extending in the axial direction of the tube, and the transparent liquid medium is packed into this groove 13. Since the split sleeve is disposed, it is possible to restrict the expansion of the liquid to the peripheral portions. If a low molecular weight monomer which can be solidified by light energy is contained in the packing liquid in the construction shown in FIG. 7a, the monomer is polymerised and solidified and the refractive index at that portion is enhanced when the light from a light source (ultra-high or low pressure mercury lamp, Xe lamp or laser) is transmitted through the core 5 of the optical fiber 2 from a direction represented by arrow 14. Since the polymerisation is not promoted at the peripheral portions, the refractive index at these portions is lower than the refractive index at the polymerized portion, and hence a so-called "optical waveguide structure" can be formed.

The present invention is not particularly limited to the embodiments described above. For example, a hollow pipe or a hollow pipe equipped with holes on its side surface may be used in place of the split sleeve 12. The end surface of the optical fiber may be polished obliquely in order to limit more the reflected wave.

At the optical coupling portion between the distributed feedback or distributed Bragg reflector semiconductor laser and the optical fiber, the present invention can reduce the reflection on the optical fiber end surface and on the semiconductor laser end surface, and can stabilize the oscillation mode of the semiconductor laser. Therefore, the present invention provides great effects for accomplishing the high speed operation and extending the distance of an optical fiber transmission system.

What is claimed is:

1. An optical coupling system between a semiconductor laser and an optical fiber characterized in that a medium having a refractive index greater than 1 but smaller than the refractive index of a semiconductor laser material is packed between the end surface of a distributed feedback type semiconductor laser and the end surface of said optical fiber, the refractive index of said medium packed between said semiconductor laser and said optical fiber changing step-wise in the axial direction of optical coupling.

2. An optical coupling system between a semiconductor laser and an optical fiber characterized in that a medium having a refractive index greater than 1 but smaller than the refractive index of a semiconductor laser material is packed between the end surface of a distributed feedback type semiconductor laser and the end surface of said optical fiber, the refractive index of said medium packed between said semiconductor laser and said optical fiber changing continuously in the axial direction of optical coupling.

3. An optical coupling system between a semiconductor laser and an optical fiber characterized in that a medium having a refractive index greater than 1 but smaller than the refractive index of a semiconductor laser material is packed between the end surface of a distributed Bragg reflector type semiconductor laser and the end surface of said optical fiber, the refractive index of said medium packed between said semiconductor laser and said optical fiber changing step-wise in the axial direction of optical coupling.

4. An optical coupling system between a semiconductor laser and an optical fiber characterized in that a medium having a refractive index greater than 1 but smaller than the refractive index of a semiconductor laser material is packed between the end surface of a distributed Bragg reflector type semiconductor laser and the end surface of said optical fiber, the refractive index of said medium packed between said semiconductor laser and said optical fiber changing continuously in the axial direction of optical coupling.

* * * * *